April 13, 1954    E. H. MUDERSBACH    2,674,898
GEAR TRANSMISSION HAVING VARIABLE SHAFT DISTANCE
Filed Dec. 4, 1950

INVENTOR
ERNST H. MUDERSBACH
BY Jarvis C. Marble
his ATTORNEY

Patented Apr. 13, 1954

2,674,898

UNITED STATES PATENT OFFICE 2,674,898

GEAR TRANSMISSION HAVING VARIABLE SHAFT DISTANCE

Ernst H. Mudersbach, Heidelberg, Germany, assignor, by mesne assignments, to Jarvis C. Marble, New York, N. Y., Leslie M. Merrill, Westfield, N. J., and Percy H. Batten, Racine, Wis., trustees Application December 4, 1950, Serial No. 198,977

9 Claims. (Cl. 74—399)

The present invention relates to gear transmissions and has particular reference to such transmissions embodying gears of large diameter.

Large gears are often subject to distortion due to strains set up upon assembly and also due to differential expansion resulting from uneven heating, as in peripheral gear drives for the rotors of regenerative heat exchangers. Such distortion may, in the case of very large gears, result in teeth being brought out of mesh and/or being meshed so deeply as to overstress and damage the gear or its supporting bearings.

It is the general object of the present invention to provide a novel and improved form of gear transmission, particularly for large gears, which will eliminate deficiencies of the kind noted above, and to this end the invention contemplates the provision of gears having intermeshing teeth and circular rim portions rigidly concentric with the pitch circles of the gears and with the rim portions confronting in a common plane and having diameters so related that they engage only when the depth of mesh between the teeth tends to exceed the maximum permissible value. Further, the invention contemplates the mounting of one of the gears on a movable shaft which is subjected to a biasing means, such as a spring or a weight, tending to move the gear on the movable shaft into mesh with its cooperating gear. With such an arrangement, overmeshing of the teeth is prevented by the rims and undermeshing is prevented by the biasing means, even in cases where distortion of substantial magnitude tends to occur.

In some instances it is desirable to provide an adjustable stop for limiting the inward or meshing movement of the movably mounted gear, so that small variations from true circular shape of one or both of the gears may be taken up by variation in the mesh of the teeth and only larger distortions taken up by contact of the rim portions. Small variations can readily be taken up by variations in the meshing of the teeth without difficulty if the teeth are of involute form and the invention further contemplates the use if desired of that form of tooth. Also, it is frequently desirable for the purpose of effecting peripheral drive of large regenerative heat exchange rotors, to make the rotor gear in the form of a rack comprised of a number of pins with which the teeth of a pinion gear mesh. Such forms of a drive are known per se but the usual form of round pin or bolt does not permit satisfactory variation of the depth of mesh, and the invention further contemplates in the construction of such type of gearing the shaping of the meshing surfaces of the pins or bolts to involute form to permit changes in the depth of mesh within prescribed limits.

Figure 1:
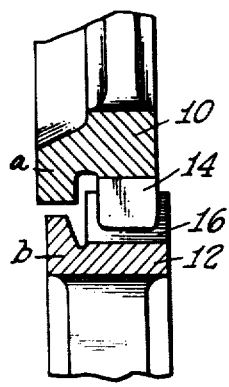
Fig. 1 is a fragmentary sectional view of the rim portions of two intermeshing gear wheels embodying the invention.
Figure 1A:
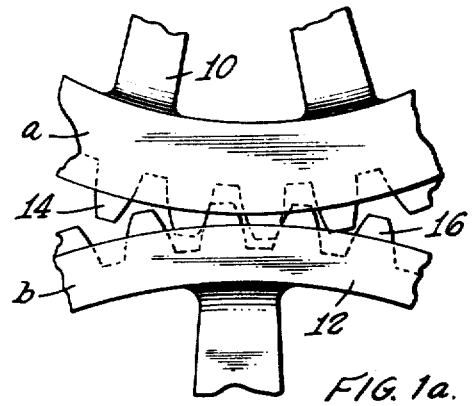
Fig. 1a is a side elevation of the gear wheels shown in Fig. 1.

Referring now to the embodiment of the invention shown in Figs. 1 and 1a, the gear wheels 10 and 12 are shown as being provided with intermeshing teeth 14 and 16 respectively which may advantageously be of involute form as shown.

Adjacent to these teeth and rigidly concentric with the pitch circles of the gears are the rim portions $a$ and $b$ which, as will be seen from Fig. 1, confront each other in a common plane. As will also be seen from the figures, the diameters of these rim portions are such that when the teeth are in normal mesh, the rims are not in contact, coming into contact only when distortion of one or both of the gears tends to cause the depth of mesh of the teeth to exceed the permissible maximum amount.

Figure 2:
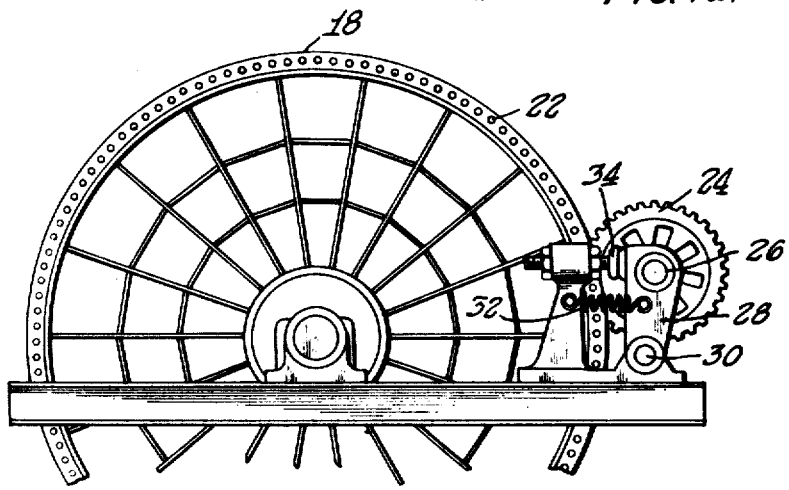
Fig. 2 shows an embodiment of the invention as applied to a rotary regenerative heat exchanger.

In Fig. 2 the invention is shown applied to the rotor 18 of a regenerative heat exchanger, rotatably carried by bearing 20 and at its rim being provided with a gear in the form of a rack comprised of a number of bolts or pins 22. The driving pinion or gear 24 in this embodiment is rotatably carried by a bearing 26 in a frame 28 pivotally mounted at 30. The pinion 24 is biased into mesh with the rack by means of spring 32 and the depth of normal mesh is established by the adjustable stop 34.

Figure 3:
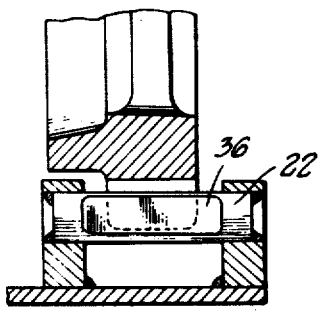
Fig. 3 shows a rack having round bolts the surfaces of which are machined to involute form.
Figure 3B:
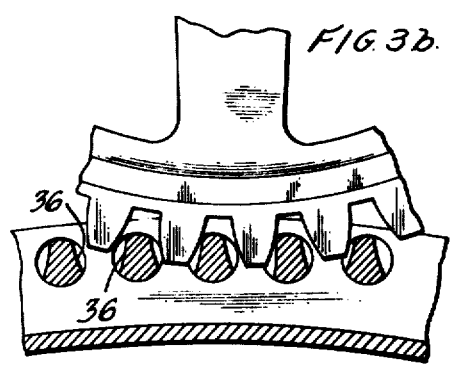
Fig. 3b is a side elevation of the gear wheels shown in Fig. 3.

In Fig. 3 there is shown in section a gearing embodying pins 22 of the kind shown in Fig. 2, these pins being provided with involute meshing surfaces 36, as seen more clearly in Fig. 3b.

While suitable examples of gearing embodying the invention have been shown and described by way of example, it will be understood that the invention contemplates all forms of apparatus falling within the scope of the appended claims.

I claim:

1. Gearing comprising a pair of shafts, a pair of gears fixed radially with respect to the axes of said shafts, said gears having intermeshing teeth and circular rim portions laterally adjacent to the teeth and rigidly concentric with the pitch circles of the gears, said rim portions having a common plane and having diameters so related to the diameters of the pitch circles of the teeth of the gears that said rim portions are out of contact with each other when the teeth are properly meshed and are operative to engage to limit the depth of engagement of the meshing teeth in the event of distortion or expansion of the gears.

2. Gearing as defined in claim 1 in which the diameters of said circular rims are smaller than but approximately the same as that of the respective pitch circles of the gears.

3. Gearing as defined in claim 1 in which one of said shafts is mounted to have movement toward or away from the other of the shafts and in which the gearing includes means for biasing the movable shaft toward the other shaft.

4. Gearing as defined in claim 3 in which adjustable stop means is provided to positively limit the minimum distance between said shafts.

5. Gearing as defined in claim 4 in which one of said gears is provided with teeth formed by a series of pins or bolts shaped with involute faces.

6. Apparatus of the character described comprising a rotor for a regenerative heat exchanger having a rotor gear thereon subject to heat distortion as the rotor is revolved, and a driving pinion gear meshing with said rotor gear to turn the rotor, said gears having coplanar circular rims concentric with the pitch circles of the gears and having diameters so related to the pitch circles of the teeth of the gears that said rims are out of contact with each other when the teeth are properly meshed and are operative to engage to limit the depth of engagement of the meshing teeth in the event of expansion of said rotor gear due to heat distortion thereof.

7. Apparatus as defined in claim 6 in which said pinion gear is pivotally mounted and yieldably biased in engagement with said rotor gear.

8. Apparatus as defined in claim 6 in which said rotor gear is many times the diameter of said pinion gear and is formed by a multiplicity of separate pins separately mounted in the rotor structure.

9. Apparatus as defined in claim 8 in which said pins are formed with involute faces for meshing engagement with the teeth of said pinion gear.

References Cited in the file of this patent

UNITED STATES PATENTS

| Number | Name | Date |
|---|---|---|
| 106,360 | Hamlin | Aug. 16, 1870 |
| 244,938 | Sheridan | July 26, 1881 |
| 1,169,458 | Bullard et al. | Jan. 23, 1916 |
| 1,377,176 | Anderson | May 10, 1921 |
| 1,832,137 | Peters | Nov. 17, 1931 |
| 2,441,901 | Petersen | May 18, 1948 |
| 2,605,646 | Karlssen et al. | Aug. 5, 1952 |

Certificate of Correction

Patent No. 2,674,898                                                    April 13, 1954

Ernst H. Mudersbach

It is hereby certified that error appears in the printed specification of the above numbered patent requiring correction as follows:

Column 4, list of references cited, insert the following:

1,282,501     Vincent_____Oct. 22, 1918
    1,696,740     Treschow_____Dec. 25, 1928 and that the said Letters Patent should be read as corrected above.

Signed and sealed this 6th day of July, A. D. 1954.

[SEAL]

ARTHUR W. CROCKER,
                                                                           *Assistant Commissioner of Patents.*